July 22, 1958 E. P. WARNKEN 2,844,354
ROTOR BLADE AND METHOD OF MAKING SAME
Filed April 8, 1954 2 Sheets-Sheet 1

INVENTOR.
ELMER P. WARNKEN
BY
Zugelter & Zugelter
Attys

July 22, 1958  E. P. WARNKEN  2,844,354
ROTOR BLADE AND METHOD OF MAKING SAME

Filed April 8, 1954  2 Sheets-Sheet 2

INVENTOR.
ELMER P. WARNKEN
BY
Zugelter & Zugelter
Attys.

United States Patent Office 2,844,354
Patented July 22, 1958

2,844,354

ROTOR BLADE AND METHOD OF MAKING SAME

Elmer P. Warnken, Cincinnati, Ohio, assignor to Cincinnati Testing & Research Laboratories, Cincinnati, Ohio, a partnership Application April 8, 1954, Serial No. 421,799

4 Claims. (Cl. 253—77)

This invention relates to a prestressed wheel and to a method of forming a prestressed wheel of resin-impregnated laminated material.

An object of this invention is to provide a prestressed resin-impregnated laminated wheel suitable for very rapid rotation.

A further object of this invention is to provide a wheel of prestressed resin-impregnated fibres in which the fibres are stressed in tension and the resin in compression, so that, when the wheel turns rapidly on its axis, the resin is not subjected to tension resulting from centrifugal force until the tension in the fibres has been neutralized by said centrifugal force. The wheels by design are so constructed that the maximum centrifugal force encountered during use does not neutralize the pre-tension of the fibres.

A further object of this invention is to provide a prestressed wheel of this type having a resin loaded in compression by fibrous re-enforcing material which is preloaded in tension.

A further object of this invention is to provide a method of forming a prestressed resin-impregnated wheel from a resin-impregnated fabric disc by molding the disc to a frusto-conic shape.

A further object of this invention is to provide a wheel having a prestressed core of resin-impregnated fibrous material and facings on the core which are unstressed.

A further object of this invention is to provide a machine for stressing resin-impregnated discs of fibrous material to prestress the fibrous material in tension while the resin is set.

The above and other objects and features of this invention will be apparent to those having ordinary skill in the art to which the invention pertains, from the following detailed description, and the drawing, in which.

In the following detailed description, and the drawing, like reference characters indicate like parts.

Figure 1:
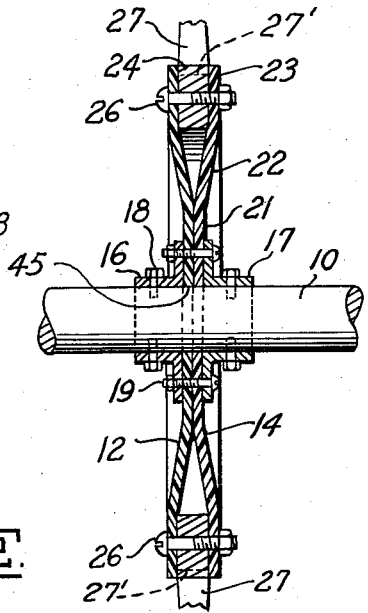
Figure 1 is a fragmentary view partly in side elevation and partly in section of a rotor shaft of an axial flow air compressor on which are mounted a pair of prestressed wheels constructed in accordance with an embodiment of this invention, the wheels supporting a rim or tire and compressor blades carried by the tire.

In Fig. 1, a rotor shaft 10 for an axial flow air compressor is shown. A pair of prestressed wheel members 12 and 14 are mounted on the shaft 10. Ring members 16 and 17 are attached to the shaft 10 and to the wheel members 12 and 14 by appropriate screws 18 and 19. As shown in Fig. 1, each of the wheels includes a substantially flat central portion 21, a sloping or frusto-conic portion 22 and an outer flat portion 23. The outer flat portions 23 of the wheels are separated by a tire ring 24 mounted therebetween. The tire ring 24 is attached to the wheels by means of bolts 26, and serves to support a plurality of compressor blades 27. The tire ring 24 is provided with key slots 27' to which the blades 27 are attached. As shown, the rims of the wheels overlie the ends of the key slots 27'.

Figure 2:
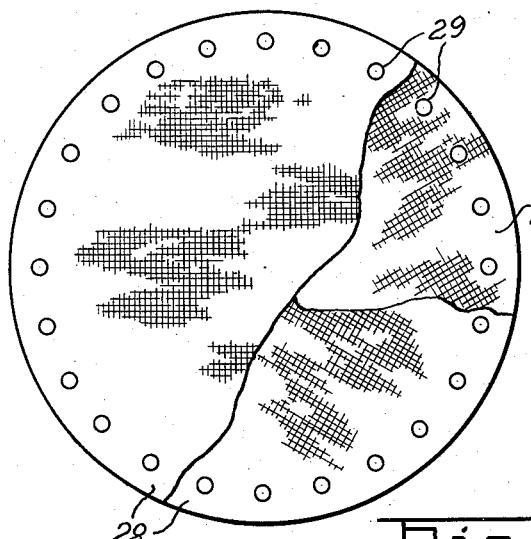
Fig. 2 is a plan view of a pile of resin-impregnated fabric laminations of disc shape used in forming one of the wheels illustrated in Fig. 1, parts of the laminations being broken away to reveal details of construction.
Figure 3:
Fig. 3 is a view in side elevation of the pile of disc-shaped laminations shown in Fig. 2.

Each of the wheels is formed from a stack or pile of resin-impregnated fabric discs 28, as indicated in Fig. 3. As indicated in Fig. 2, the fabric discs are so stacked that the fabric of the discs is offset rotationwise, from disc to disc, as shown most clearly in Fig. 2. Where, as shown, six discs are used in the pile, each disc is angularly disposed 15° from the next adjacent disc. The outer edges of the discs are provided with a plurality of openings 29.

Figure 4:
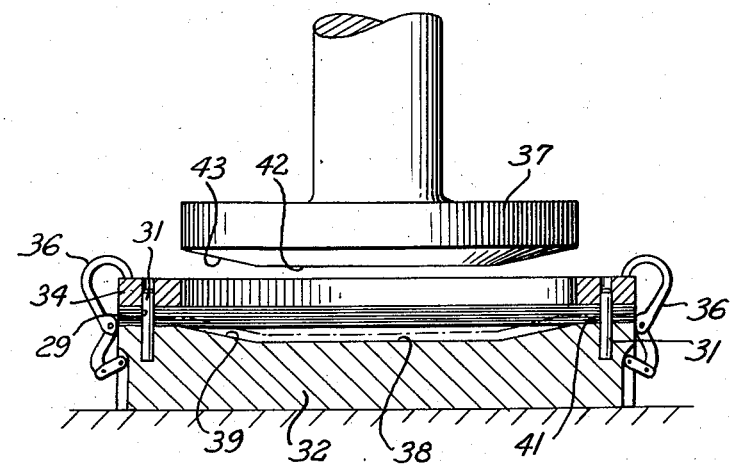
Fig. 4 is a view partly in side elevation and partly in section of a machine for forming the wheels, with the pile of laminations of Figs. 2 and 3 mounted therein.

As shown in Fig. 4, the openings 29 receive pins 31 which serve to hold the edges of the discs. The pins 31 are mounted in a base die member 32 and serve to hold the edges of the discs and also to guide a disc-clamping ring 34. The ring 34 is clamped down upon the edges of the discs of the pile of discs by means of clamps 36. When the edges of the discs have been clamped, a movable molding die member 37 is pushed downwardly against the laminations to shape and mold the laminations. The lower molding member 32 has a flat central portion 38, a frusto-conic side portion 39 and a flat outer ring portion 41. The upper die 37 is provided with a flat central face 42 opposite the lower die face 38 and a sloping frusto-conic side portion 43 opposite the frusto-conic face 39 of the lower die. When the upper die member is urged downwardly to shape and mold the discs to a frusto-conic shape, the discs are stressed, and the fabric thereof is stressed and tensioned and the strands of the fabric are stressed or stretched. As already pointed out, the discs are resin-impregnated. The dies are heated in any appropriate manner, not shown, so that when the dies are brought together, the resin is set to hold the fibres of the discs in permanently prestressed condition.

The fabric of the discs may be any appropriate fabric. In the forming of a preferred wheel, the fabric of the discs may be fibre glass fabric. The resin with which the fibre glass fabric is impregnated may be any suitable thermosetting resin, such as a phenol-formaldehyde resin.

Figure 5:
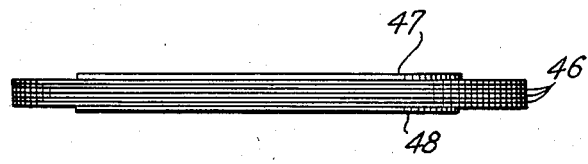
Fig. 5 is a view in side elevation of a pile of resin-impregnated laminations used in forming a wheel constructed in accordance with another embodiment of this invention.
Figure 6:
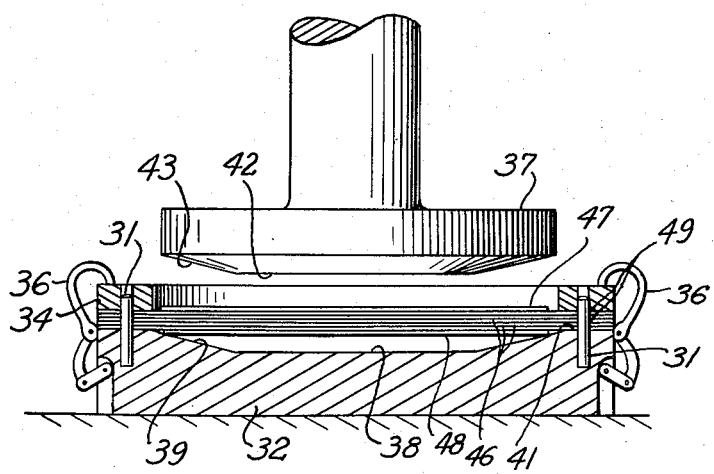
Fig. 6 is a view partly in side elevation and partly in section of the machine of Fig. 4 with the pile of laminations of Fig. 5 in place therein.

In Fig. 5 is shown a pile of resin-impregnated discs 46, 47, and 48. The discs 46 are core forming discs and the discs 47 and 48 are facing discs. Facing discs 47 and 48 are mounted on opposite sides of the pile of discs. As shown, the diameter of each of the facing discs is smaller than the diameter of the core discs. As shown in Fig. 6, the discs are mounted with the pins 31 of the molding machine extending through openings 49 in the core discs. The facing discs 47 and 48 terminate short of the disc-clamping ring 34 and are not clamped thereby so that, when the upper die 37 is pushed downwardly to prestress and mold the core discs, the facing discs are unstressed. The wheel formed from the pile of discs shown in Fig. 5 thus has a prestressed core having facings on the opposite sides thereof which are normally held in compression by the prestressed core.

As shown in Fig. 1, an opening 45 may be bored in the center of each wheel to receive the shaft 10 on which the wheel is mounted.

The dies are designed to cause a sufficient stressing of the fibres of the discs to prestress the discs with the fibres being loaded in tension and the resin being loaded in compression to a sufficient degree so that when the shaft 10 (see Fig. 1) and the wheels and blades are rotated, the centrifugal load is taken by the prestressed fibres of the wheels and the resin remains in compression at all times, unless the centrifugal load exceeds the pre-tension stress in the fibres. The wheels are designed so that, at the maximum speed of rotation for which the wheels are designed, the centrifugal load is less than the pre-stress load and the resin is held in compression.

The wheels may be used in pairs, as shown in Fig. 1, or may be used separately and may be used to support any desired type of rotating device.

The prestressed wheels and the method and machinery for making them, as described above and illustrated in the drawing, are subject to modification without departing from the spirit and scope of the appended claims.

Having described my invention, what I claim as new and desire to secure by Letters Patent is:

1. A method of forming a prestressed wheel of thermosetting resin, that consists in separately forming each of a pair of disc mats of glass fibres and thermosetting resin, separately securing the rim portion of each disc, and while secured, deforming the portion of each disk within the rim thereof, out of the plane of the rim, an amount sufficient to stress the glass fibres in tension to provide a central substantially flat portion and a substantially frusto-conic portion connecting the central portion and the rim curing the discs while so deformed, securing the deformed discs together with the central deformed portions thereof back to back, placing a tire ring within the rims of said discs, and securing them to the tire ring.

2. A wheel for turbine blades comprising a pair of dished discs composed of thermosetting resin having therein stressed reinforcing strands of fibre glass which subject the resin of the wheel to radial compression forces, the centers of said discs being secured in contacting relation, and the rims thereof being axially spaced to form an annulus, and a ring in said annulus secured to the rims of said discs, said ring having key slots therein to which turbine blades may be attached.

3. A turbine rotor which comprises a shaft, a pair of dished molded discs mounted on said shaft, each of said molded discs being composed of thermosetting resin having therein stressed reinforcing strands of fibre glass which subject the resin of the disc to radial compression forces, each molded disc having a substantially flat central portion, a rim radially displaced from the central portion, and a sloping portion connecting the rim and the central portion, the central portions of said discs being secured in contacting back-to-back relation, and the rims thereof being axially spaced to form an annular groove, a ring in said groove, and means for securing the ring to the rims of the discs, said ring having key slots therein, and turbine blades mounted in said key slots.

4. A turbine rotor which comprises a shaft, a pair of dished molded discs mounted on said shaft, each of said molded discs being composed of thermosetting resin having therein stressed reinforcing strands of fibre glass which subject the resin of the disc to radial compression forces, each molded disc having a substantially flat central portion, a rim radially displaced from the central portion, and a sloping portion connecting the rim and the central portion, the central portions of said discs being in contacting back-to-back relation, and the rims thereof being axially spaced to form an annular groove, a ring in said groove, means for securing the ring to the rims of the discs, said ring having key slots therein, and turbine blades mounted in said key slots, the rims of the discs overlying ends of the key slots to retain the blades in the key slots.

References Cited in the file of this patent

UNITED STATES PATENTS

| | | |
|---|---|---|
| 1,298,524 | London | Mar. 25, 1919 |
| 1,561,765 | Atwood | Nov. 17, 1925 |
| 1,912,931 | Clay | June 6, 1933 |
| 2,417,586 | Crosley | Mar. 18, 1947 |
| 2,500,598 | Axelrod | Mar. 14, 1950 |
| 2,559,013 | Eastman | July 3, 1951 |
| 2,717,554 | Stalker | Sept. 3, 1955 |

FOREIGN PATENTS

| | | |
|---|---|---|
| 21,756 | Great Britain | 1907 |